(12) United States Patent
Wu (10) Patent No.: US 9,768,861 B2
(45) Date of Patent: Sep. 19, 2017

(54) INPUT DEVICE AND SHORT-RANGE WIRELESS COMMUNICATION CONVERTER THEREOF

(71) Applicants: ABBAHOME INC., Taipei (TW); DIGIMORE ELECTRONICS CO., LTD., Taipei (TW)

(72) Inventor: Chih-Hsuan Wu, Taipei (TW)

(73) Assignees: ABBAHOME INC., Taipei (TW); DIGIMORE ELECTRONICS CO., LTD., Taipei (TW)

( * ) Notice: Subject to any disclaimer, the term of this patent is extended or adjusted under 35 U.S.C. 154(b) by 0 days.

(21) Appl. No.: 15/352,334

(22) Filed: Nov. 15, 2016

(65) Prior Publication Data

US 2017/0063447 A1 Mar. 2, 2017

Related U.S. Application Data

(63) Continuation-in-part of application No. 13/742,677, filed on Jan. 16, 2013.

(51) Int. Cl.
| | |
|---|---|
| *G06F 21/32* | (2013.01) |
| *H04B 7/24* | (2006.01) |
| *H04W 4/00* | (2009.01) |
| *G06F 13/38* | (2006.01) |

(52) U.S. Cl.
CPC ............ *H04B 7/24* (2013.01); *G06F 13/385* (2013.01); *H04W 4/008* (2013.01)

(58) Field of Classification Search
CPC . H04B 7/24; G06F 21/32; G06F 21/36; G06F 3/04
See application file for complete search history.

(56) References Cited

U.S. PATENT DOCUMENTS

| 6,845,279 B1 | 1/2005 | Gilmore et al. | |
| 2002/0173344 A1* | 11/2002 | Cupps ................... | G06F 1/1626 455/566 |
| 2004/0114982 A1 | 6/2004 | Lip | |
| 2006/0227112 A1* | 10/2006 | Hsieh ..................... | G06F 3/021 345/168 |
| 2007/0239921 A1* | 10/2007 | Toorians ............... | G06F 1/1616 710/306 |

(Continued)

*Primary Examiner* — Henry Tsai
*Assistant Examiner* — Christopher A Daley
(74) *Attorney, Agent, or Firm* — WPAT, P.C., Intellectual Property Attorneys; Anthony King (57) ABSTRACT

A short-range wireless communication converter of an input device has a micro-controller unit (MCU), a first-protocol connection port, a second-protocol connection port, a protocol signal converter and a short-range wireless communication unit. The first-protocol connection port is connected to an input and output (I/O) terminal of the MCU. The second-protocol connection port is another I/O terminal of the MCU through the protocol signal converter. The MCU is further connected to the short-range wireless communication unit. When a wired computer input device is connected with the first-protocol connection port or the second-protocol connection port, the output signals can be wirelessly transmitted to a paired computer through the MCU and the short-range wireless communication unit so that the wired computer input device can be converted to wirelessly input data to a paired computer compatible with a specific protocol.

8 Claims, 14 Drawing Sheets

(56) References Cited

U.S. PATENT DOCUMENTS

| | | | | |
|---|---|---|---|---|
| 2008/0169703 | A1* | 7/2008 | Cheon | H02J 1/08 |
| | | | | 307/31 |
| 2009/0221332 | A1* | 9/2009 | Bamberger | H04B 1/3805 |
| | | | | 455/572 |
| 2009/0315864 | A1* | 12/2009 | Silverbrook | G06F 3/03545 |
| | | | | 345/179 |
| 2012/0283015 | A1* | 11/2012 | Bonanno | H04R 3/00 |
| | | | | 463/35 |

* cited by examiner

INPUT DEVICE AND SHORT-RANGE WIRELESS COMMUNICATION CONVERTER THEREOF

CROSS-REFERENCE TO RELATED APPLICATIONS

This application is a continuation-in-part (CIP) application of U.S. application Ser. No. 13/742,677, filed on Jan. 16, 2013, the disclosures of which are incorporated herein in their entirety by reference.

BACKGROUND OF THE INVENTION

1. Field of the Invention

The present invention relates to an input device and a short-range wireless communication converter thereof and more particularly to a converter capable of converting a computer input device with a wired input pattern into that with a wireless input pattern in compliance with a specific communication protocol.

2. Description of the Related Art

Since the advent of computers, computer keyboards are always the most indispensable type of input devices. After windows operating system overwhelm the market, computer mice are equally important as computer keyboards. However, the roles of keyboards and mice serving as critical input devices become somewhat uncertain after the release of touch interfaces. Given the currently popular tablet personal computers (PC) as an example, touch interfaces dominate as the main input device because of their direct operation in comparison with that of keyboards or mice. If all users want is to browse contents on the screen, touch interfaces certainly suffice the need. Whereas, in the event of a large input of texts and numbers, touch interfaces are far more inefficient than keyboards to many users. Even for the lovers of tablet PCs, conventional input tools, such as keyboards, are still the first choice to deal with large input of texts and numbers.

The compatibility support of the tablet PCs in terms of connection with the conventional input devices, such as keyboards, mice and the like, is not as simple and straightforward as expected. The reason behind that is certain tablet PCs do not support common connection protocols. For example, iPad made by Apple does not support the conventional interface ports, such as USB, PS/2 and the like. To connect a keyboard or mouse to iPad, the keyboard or mouse must be compatible with the protocols used in iPad. In other words, a new set of input devices dedicated to such kind of tablet PC should be additionally purchased and it becomes another expenditure to users. From the foregoing, the conventional wired input devices have the compatibility problem when applied to tablet PCs. In fact, wireless input devices also have the same compatibility problem. Infrared (IR) and radio frequency (RF) are two common communication techniques employed by regular wireless input devices. However, certain tablet PCs only support short-range wireless communication protocol, rendering the regular wireless input device useless to tablet PCs.

SUMMARY OF THE INVENTION

A first objective of the present invention is to provide a short-range wireless communication converter enabling a conventional input device to communicate with a paired computer through the short-range wireless communication protocol after the conventional input device is connected with the short-range wireless communication converter so that a conventional computer input device can also support device supporting a specific protocol.

To achieve the foregoing objective, the short-range wireless communication converter of an input device has a micro-controller unit (MCU), a first-protocol connection port, a second-protocol connection port and a short-range wireless communication unit.

The MCU has multiple input and output (I/O) terminals.

The first-protocol connection port is connected to at least one I/O terminal of the MCU and has a power pin.

The second-protocol connection port is connected to at least one I/O terminal of the MCU through a protocol signal converter and has a power pin.

The short-range wireless communication unit is connected to at least one I/O terminal of the MCU.

The foregoing short-range wireless communication converter supports at least two connection ports compatible with different protocols for users to select one of the connection ports to connect with a conventional input device according to the specification of the conventional input device. Hence, signals outputted from the input device can be wirelessly transmitted to a paired device through the short-range wireless communication converter and the conventional wired input device can be converted to wirelessly input data to the paired device supporting the short-range wireless communication protocol.

A second objective of the present invention is to provide an input device having a short-range wireless communication converter capable of being converted from a wired input means to a wireless input means and used for a paired device supporting a specific protocol.

To achieve the foregoing objective, the input device having a short-range wireless communication converter has a computer input device and a body.

The computer input device has a bottom.

The body is integrated on the bottom of the computer input device and has the foregoing short-range wireless communication converter and a cable-receiving slot.

The short-range wireless communication converter is mounted inside the body. The first-protocol connection port and the second-protocol connection port of the short-range wireless communication converter are mounted on the body.

The cable-receiving slot is formed in a bottom of the body.

The foregoing short-range wireless communication converter can be mounted inside a body and the body is integrated on a bottom of a computer input device to become a part of the computer input device, rendering a convenient operation.

Other objectives, advantages and novel features of the invention will become more apparent from the following detailed description when taken in conjunction with the accompanying drawings.

DETAILED DESCRIPTION OF THE INVENTION

With reference to FIGS. 1A to 1D, a short-range wireless communication converter of an input device in accordance with the present invention has a micro-controller unit (MCU) 10, a first-protocol connection port 11, a second-protocol connection port 12, a short-range wireless communication unit 20, a protocol signal converter 13 and a power circuit 30.

The MCU 10 has multiple input and output terminals (I/O ports) to respectively connect to the first-protocol connection port 11, the second-protocol connection port 12, the short-range wireless communication unit 20 and the protocol signal converter 13.

In the present embodiment, the first-protocol connection port 11 is a PS/2 socket. Two pins, DM and DP, are respectively connected to two input and output terminals of the MCU 10. When an input device is PS/2 compatible, it can be connected with the first-protocol connection port 11.

The second-protocol connection port 12 is a USB port for an input device with a USB interface to connect therewith. To ensure that signals inputted through the USB port can be normally recognized by the MCU 10, the second-protocol connection port 12 is connected to corresponding data pins DATA+ and DATA− of the protocol signal converter 13. The protocol signal converter 13 is connected to the MCU 10 through multiple pins thereof. When the input device with the USB interface sends a signal through the second-protocol connection port 12, the signal is converted by the protocol signal converter 13 into a digital form and then is sent to the MCU 10. To those with ordinary skill in the related art, the MCU 10 can be built in the protocol signal converter 13 as a part of the protocol signal converter 13 or the protocol signal converter 13 can be built in the MCU 10 as a part of the MCU 10.

The short-range wireless communication unit 20 is connected to multiple input and output terminals of the MCU 10 to transmit signals, and is further connected to an indicator circuit 40 and a pairing button 14. The indicator circuit 40 has at least one light-emitting diode (LED). In the present embodiment, the indicator circuit 40 has multiple LEDs, LED1, LED2 and LED3. One end of each LED, LED1, LED2 and LED3, is connected to a different pin of the short-range wireless communication unit 20, and the other end is connected to a power source through a resistor. When the short-range wireless communication unit 20 changes the voltages of those pins thereof, different LEDs emit light indicative of pairing status, battery power level, operation status and the like. The pairing button 14 serves to pair with a device to be connected.

When the MCU 10 receives a signal from the first-protocol connection port 11 or from the second-protocol connection port 12 through the protocol signal converter 13, the signal is encoded and transmitted to the short-range wireless communication unit 20 for the short-range wireless communication unit 20 to wirelessly transmit the signal to a paired device.

The power circuit 30 has a first voltage regulation circuit 31, a second voltage regulation circuit 32 and a battery 33. Each of the first voltage regulation circuit 31 and the second voltage regulation circuit 32 has a voltage regulator U2, U5. An input terminal of each voltage regulator U2, U5 is connected to the battery 33. An output terminal of the first voltage regulation circuit 31 is connected to the MCU 10, the protocol signal converter 13 and the short-range wireless communication unit 20 to supply an operating power thereto. An output terminal of the second voltage regulation circuit 32 is connected to a power pin of each of the first-protocol connection port 11 and the second-protocol connection port 12 to supply power to the input devices with the PS/2 and USB interfaces connected with the first-protocol connection port 11 and the second-protocol connection port 12.

Figure 2:
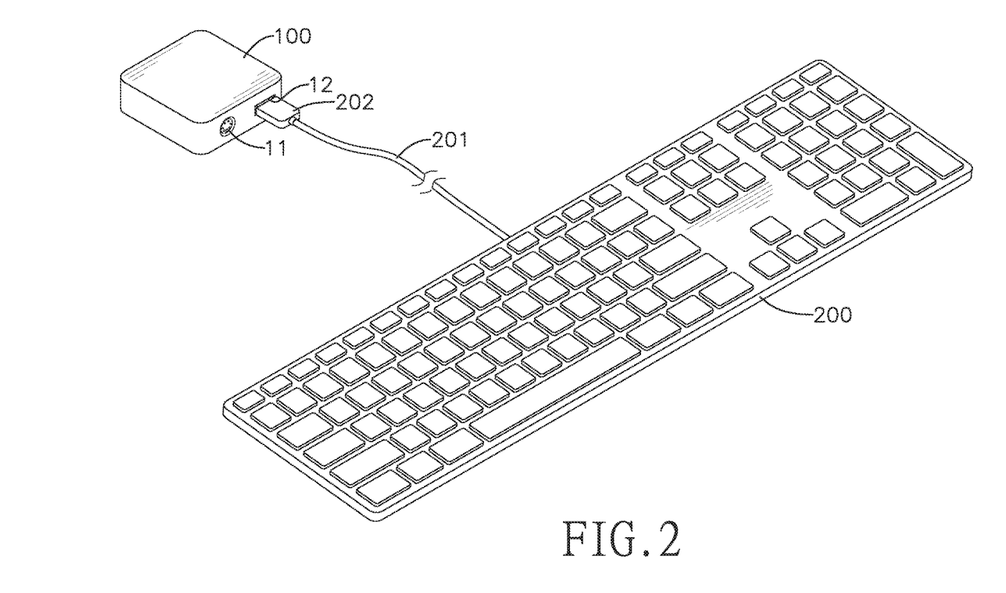
FIG. 2 is a perspective view of the short-range wireless communication converter in FIGS. 1A to 1D connected to an input device.

To thoroughly describe the detailed circuit of the short-range wireless communication converter, with reference to FIG. 2, the short-range wireless communication converter is mounted inside a body 100, and the first-protocol connection port 11 and the second-protocol connection port 12 are mounted inside the body 100 for two compatible input devices 200 to be plugged therein. The input device 200 includes but not limited to a keyboard, a mouse, a trackball, a joystick and the like. In the present embodiment, the input device 200 is a keyboard and has a cable 201. One end of the cable 201 is mounted on the input device 200 and a USB connector 202 is mounted on the other end of the cable 201 and is plugged in the second-protocol connection port 12 on the body 100.

After any type of the foregoing input devices 200 is connected with the first-protocol connection port 11 or the second-protocol connection port 12 on the body 100, any input operation performed by users through the input device 200 sends a corresponding signal to the body 100. The signal is encoded by the MCU 10 inside the body 100 and then is transmitted to a paired device by the short-range wireless communication unit 20. The paired device may be a tablet PC, a smart phone, a personal digital assistant (PDA), a notebook computer or the like. Hence, the original wired input device can be converted to serve as a wireless input device. The short-range wireless communication converter is applicable to a device supporting the short-range wireless communication protocol, such as a tablet PC, a smart phone or the like.

Figure 3:
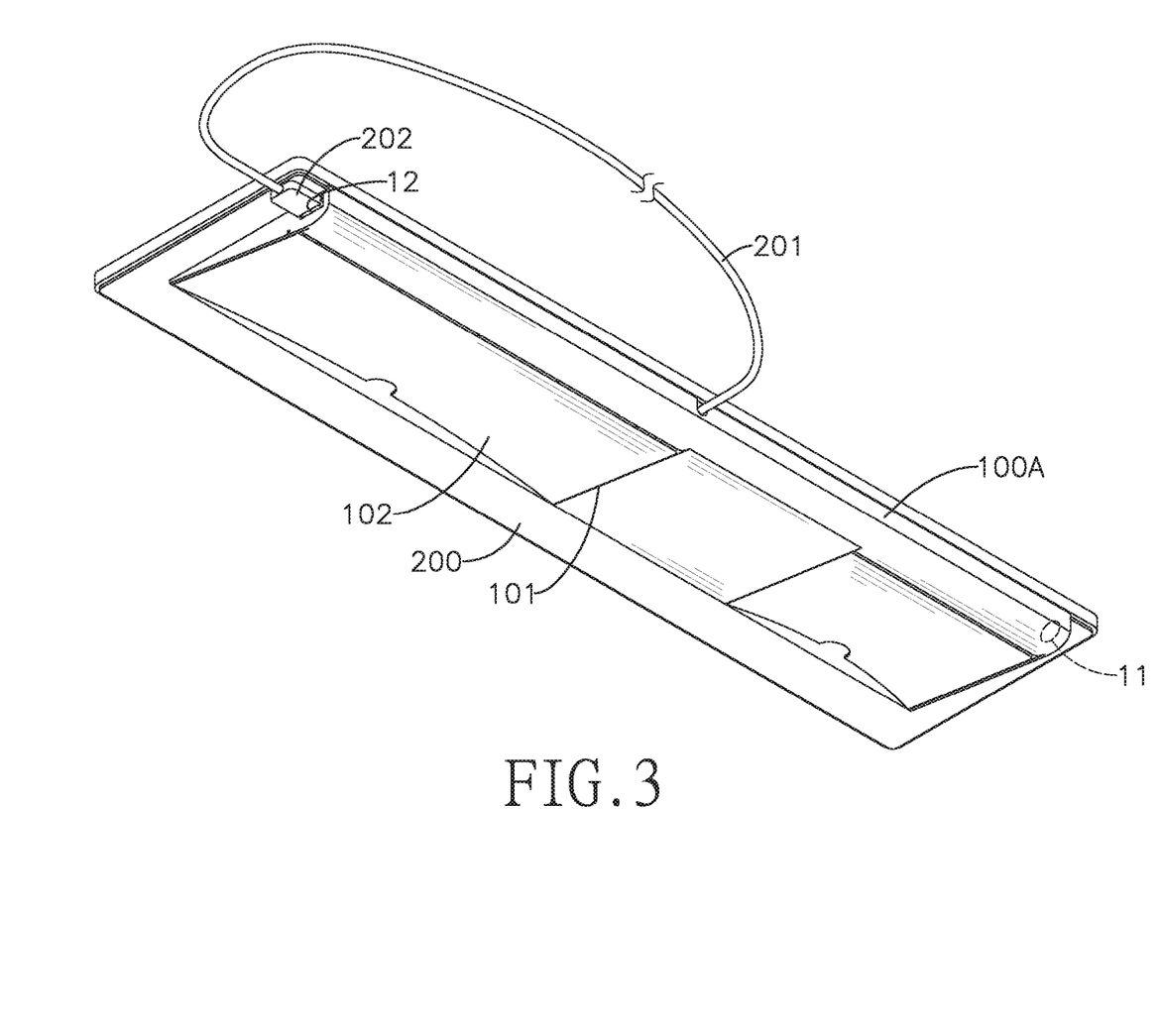
FIG. 3 is a perspective view of the short-range wireless communication converter in FIGS. 1A to 1D integrated in an input device.
Figure 4:
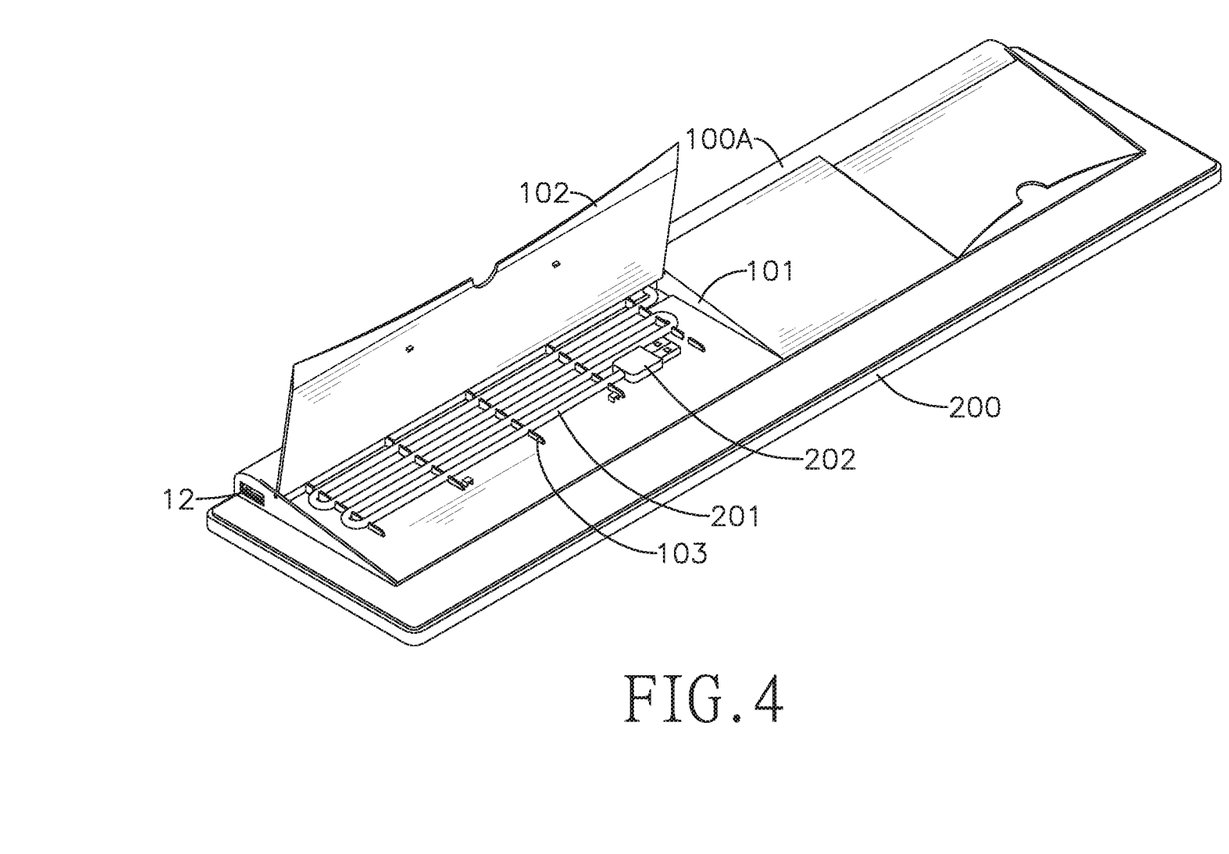
FIG. 4 is another perspective view of the short-range wireless communication converter in FIGS. 1A to 1D integrated in the input device in FIG. 3.

Furthermore, the body 100 can be integrated with the input device 200 to become a part of the input device 200. The body 100 further has a cable-receiving slot to receive the cable of the input device 200. With reference to FIGS. 3 and 4, the body 100A may be a hollow base integrated on a bottom of the input device 200. The body 100A has a length and a width less than those of the input device 200 and declines along a direction of the width so as to support the input device at a tilted angle. The first-protocol connection port 11 and the second-protocol connection port 12 are respectively formed on two ends of the body 100A. The body 100A further has a hollow cable-receiving slot 101, a cover 102 and multiple cable management strips 103. The cable-receiving slot 101 is formed in a bottom of the body 100A. The cover 102 is detachably mounted on the cable-receiving slot 101 to cover the cable-receiving slot 101. The cable management strips 103 are formed inside the cable-receiving slot 101 and each cable management strip 103 has multiple notches formed therein. When the input device 200 is not operated, the cable 201 can be received within the cable-receiving slot 101 by winding the cable 201 and inserting the cable 201 in the notches of the cable management strips 103 so as to organize the cable 201 within the input device 200.

With reference to FIGS. 5A to 5D, a second embodiment of a short-range wireless communication converter in accordance with the present invention differs from the foregoing embodiment in that the second embodiment further has a switch 105 and a connector 104 and some circuits are adjusted to incorporate the addition of the switch 105 and the connector 104. In the present embodiment, the connector 104 is a USB connector, and the second-protocol connection port 12 is also USB compatible. The power circuit 30' has a voltage regulator U2 and has an input terminal and an output terminal. The output terminal is connected to the MCU 10, the protocol signal converter 13 and the short-range wireless communication unit 20. The input terminal is connected to a power pin of the second-protocol connection port 12 and a power pin of the connector 104. In other words, the operating power of the power circuit 30' comes from the second-protocol connection port 12 or from the connector 104.

The data pins D+, D– of the second-protocol connection portion 12 are connected to the connector 104 or the protocol signal converter 13 through the switch 105. It is the switch 105 that switches the second-protocol connection port 12 to connect with the connector 104 or with the protocol signal converter 13. In other words, the switch 105 has mode-switching capability. When the second-protocol connection port 12 is connected to the input device 200, the connector 104 is connected to a computer and the switch 105 switches to connect the second-protocol connection port 12 with the connector 104, the input device 200 is maintained to input in a wired fashion so as to connect with the computer and transmit signals through the second-protocol connection port 12 and the connector 104.

When the switch switches to connect the second-protocol connection port 12 with the protocol signal converter 13, the input device 200 is maintained to input wirelessly and the signals transmitted by the input device 200 are sent to and converted by the protocol signal converter 13 and then are encoded by the MCU 10 before being outputted to the short-range wireless communication unit 10. The short-range wireless communication unit 10 then wirelessly transmits the encoded signals to a paired device.

Figure 1A:
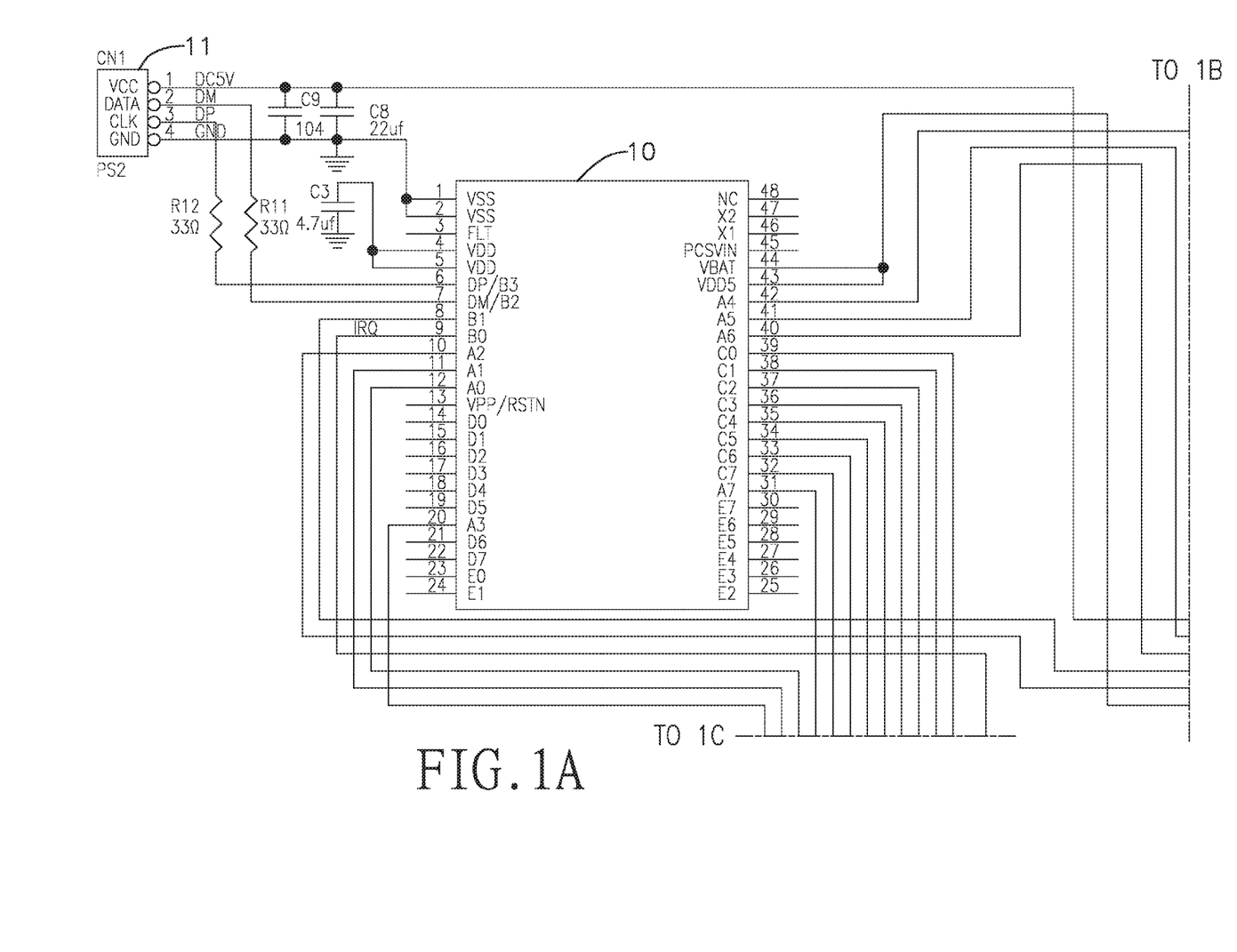
FIGS. 1A to 1D are divisions of a circuit diagram of a first embodiment of a short-range wireless communication converter of an input device in accordance with the present invention.
Figure 1B:
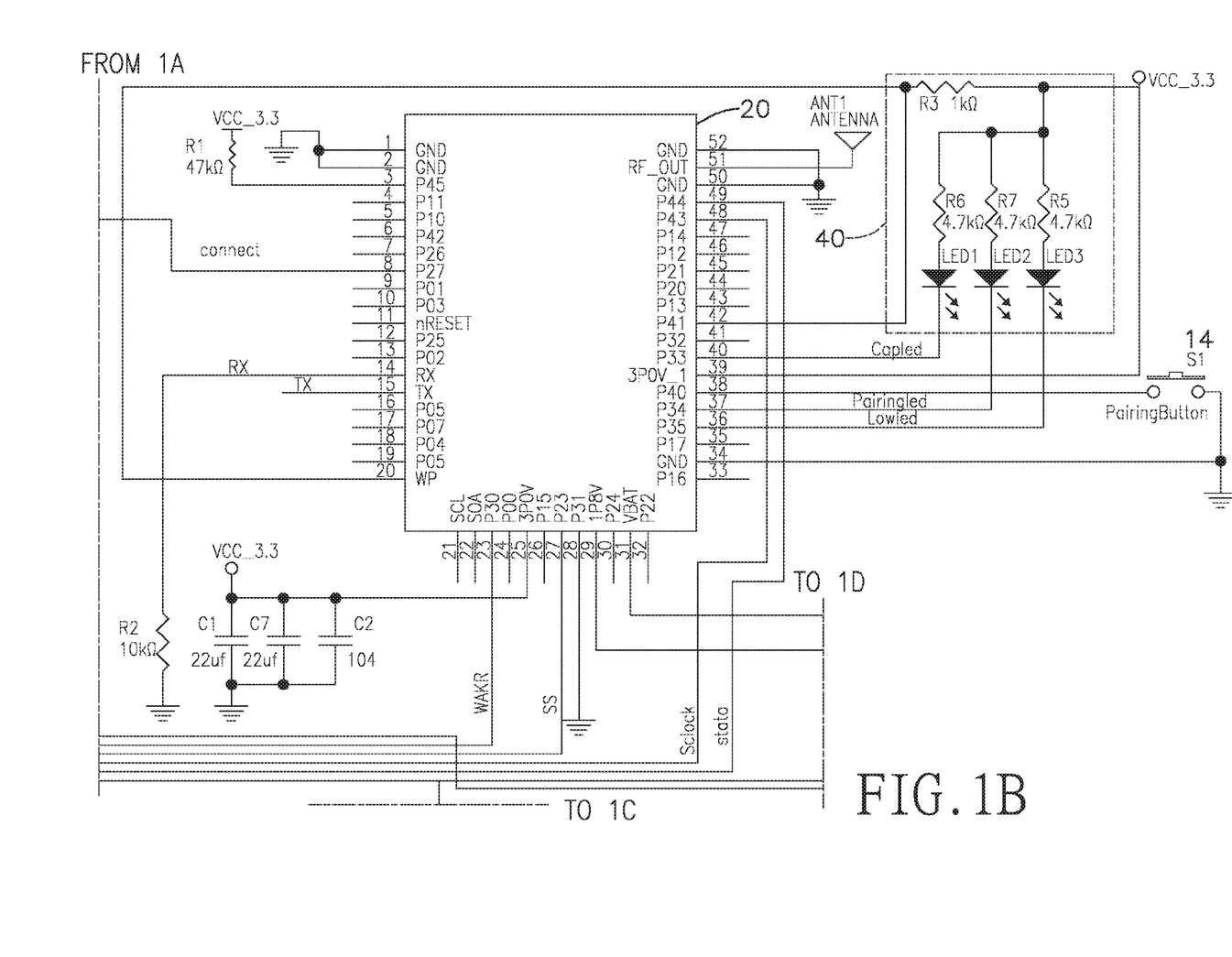
Figure 1C:
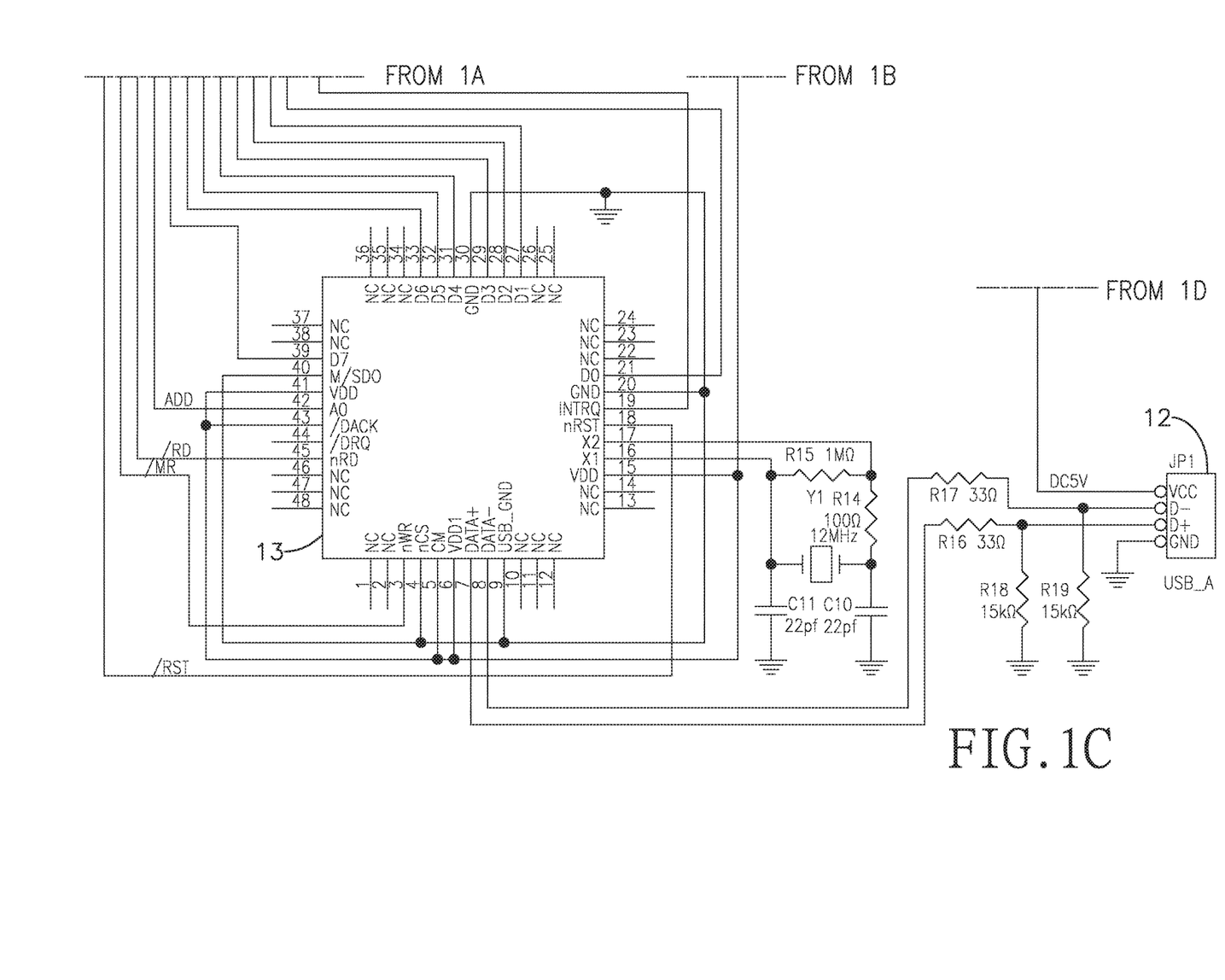
Figure 1D:
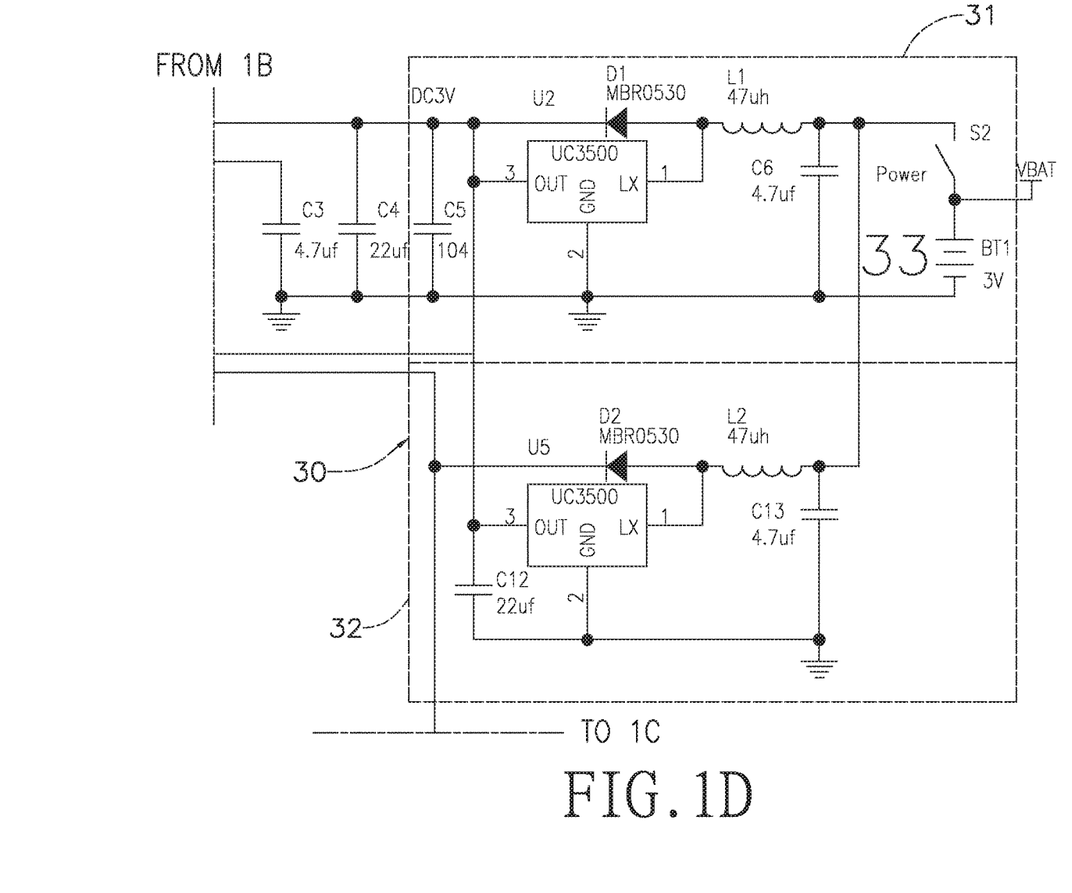
Figure 5A:
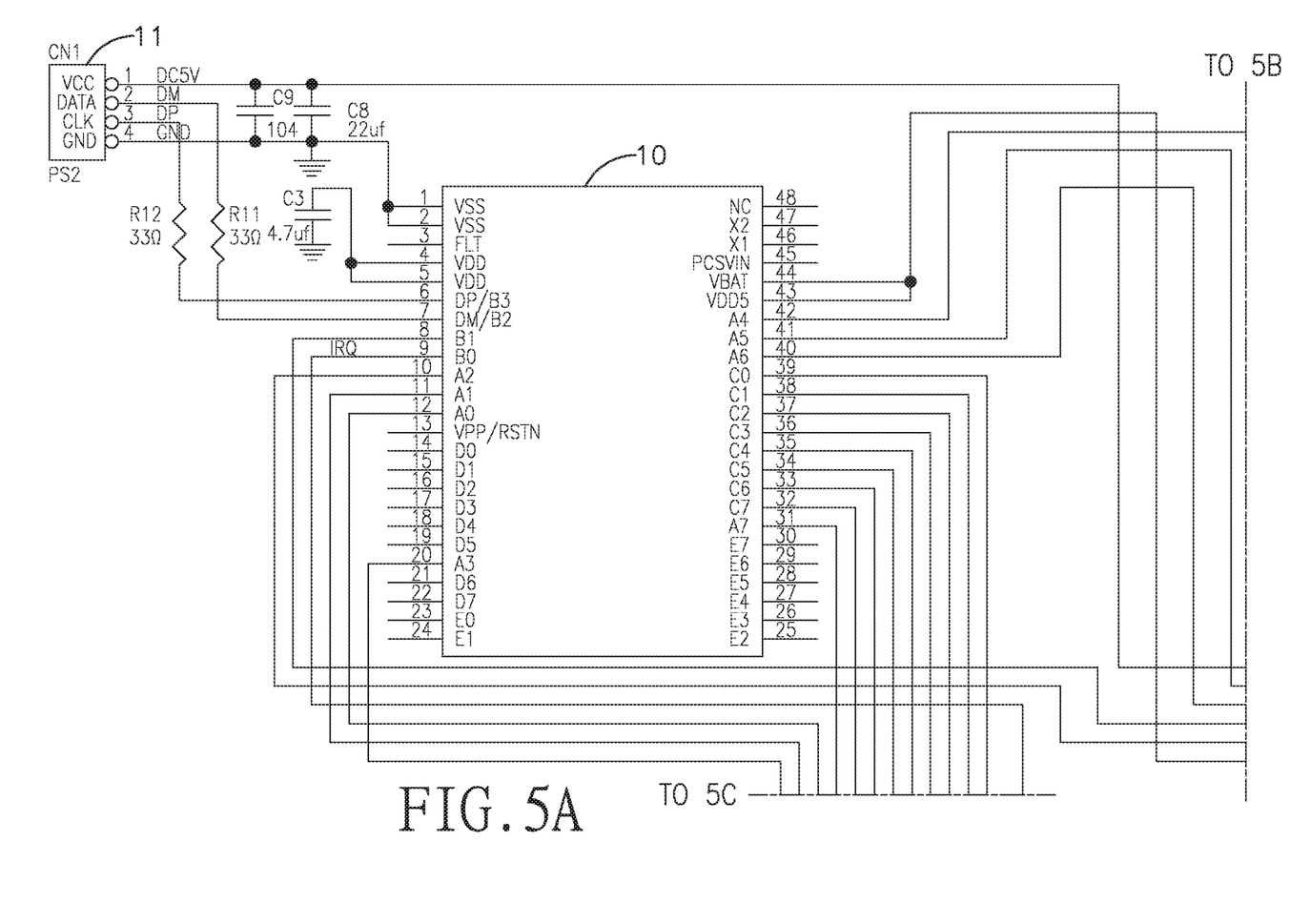
FIGS. 5A to 5D are divisions of a circuit diagram of a second embodiment of a short-range wireless communication converter of an input device in accordance with the present invention.
Figure 5B:
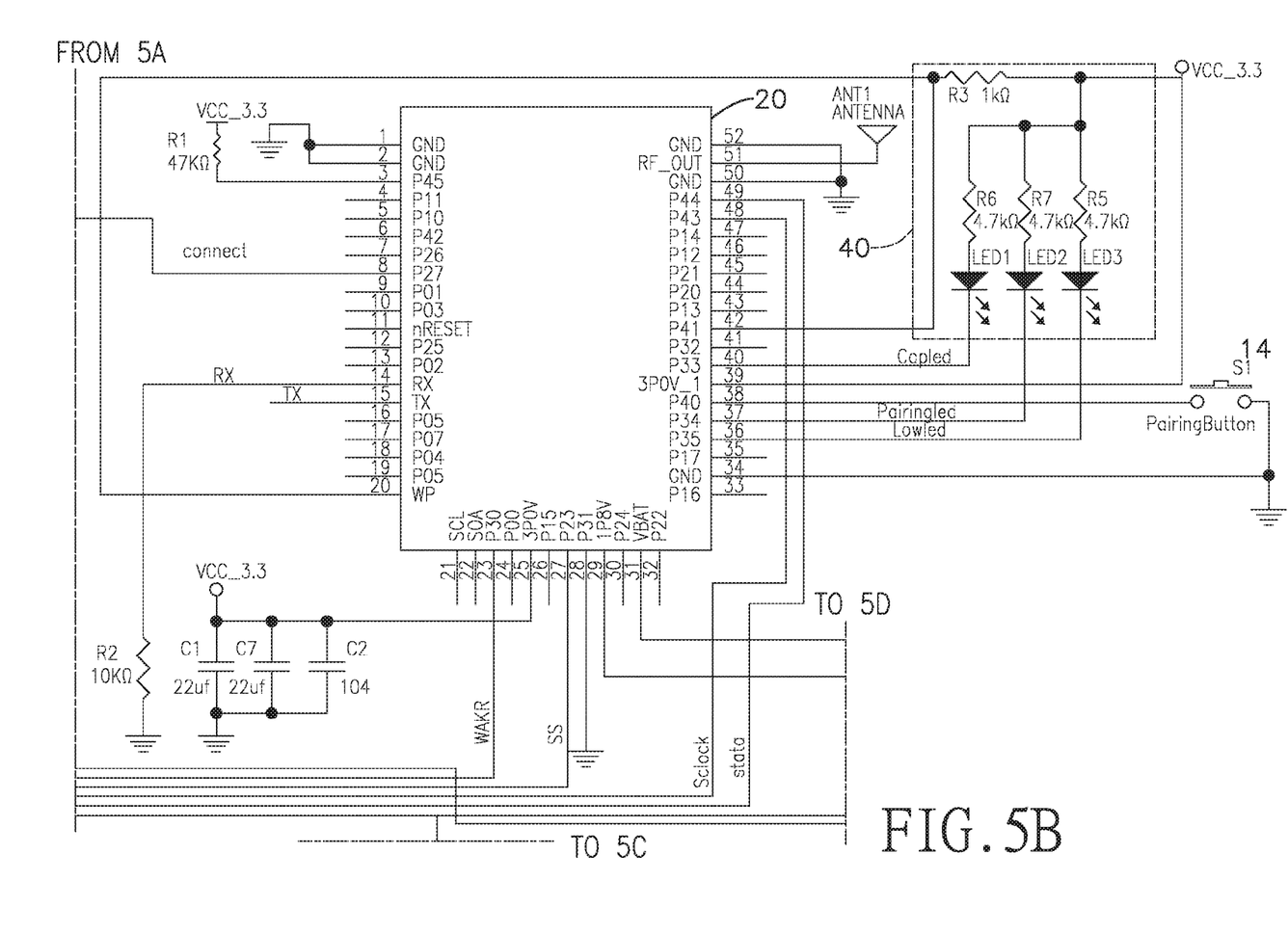
Figure 5C:
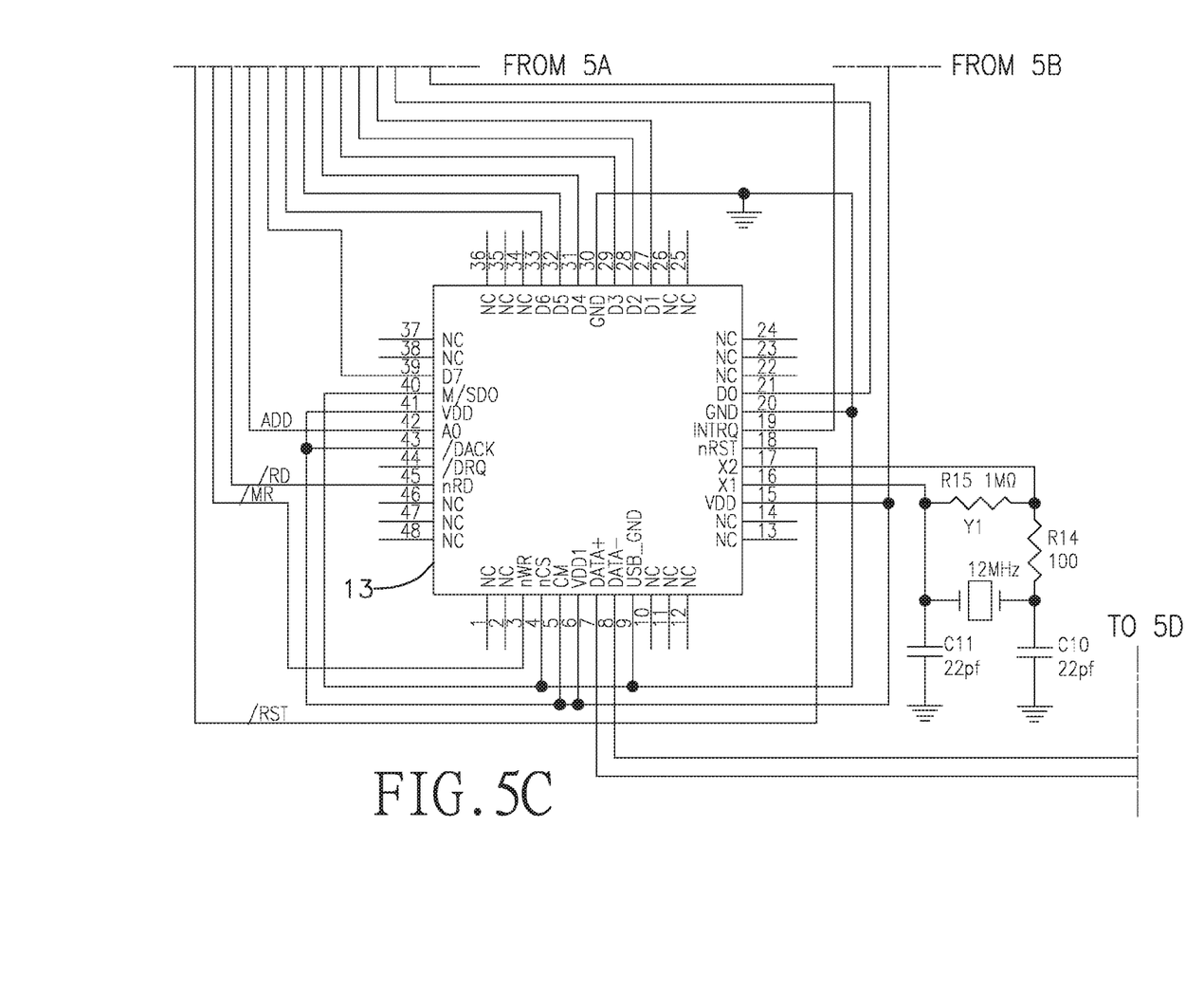
Figure 5D:
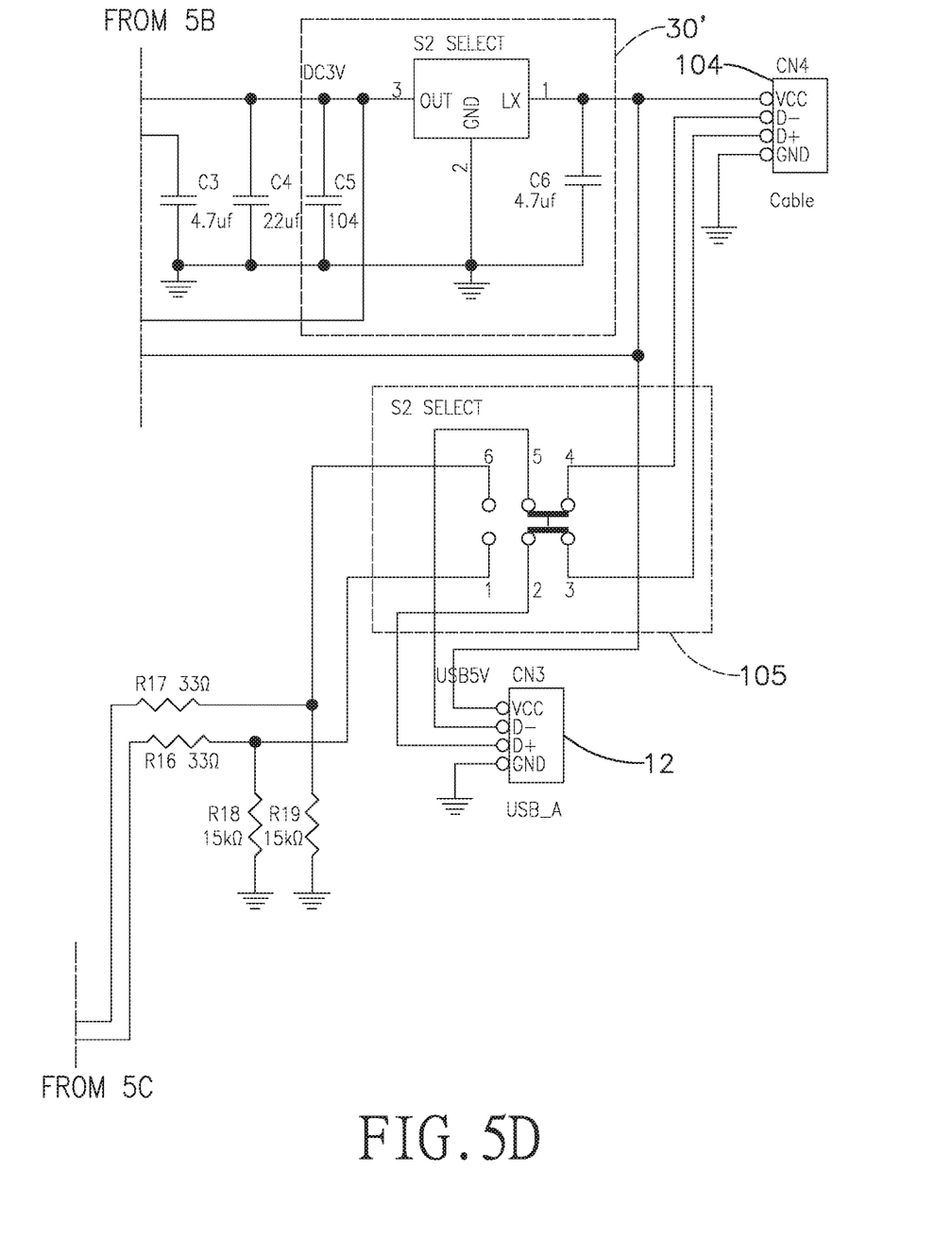
Figure 6A:
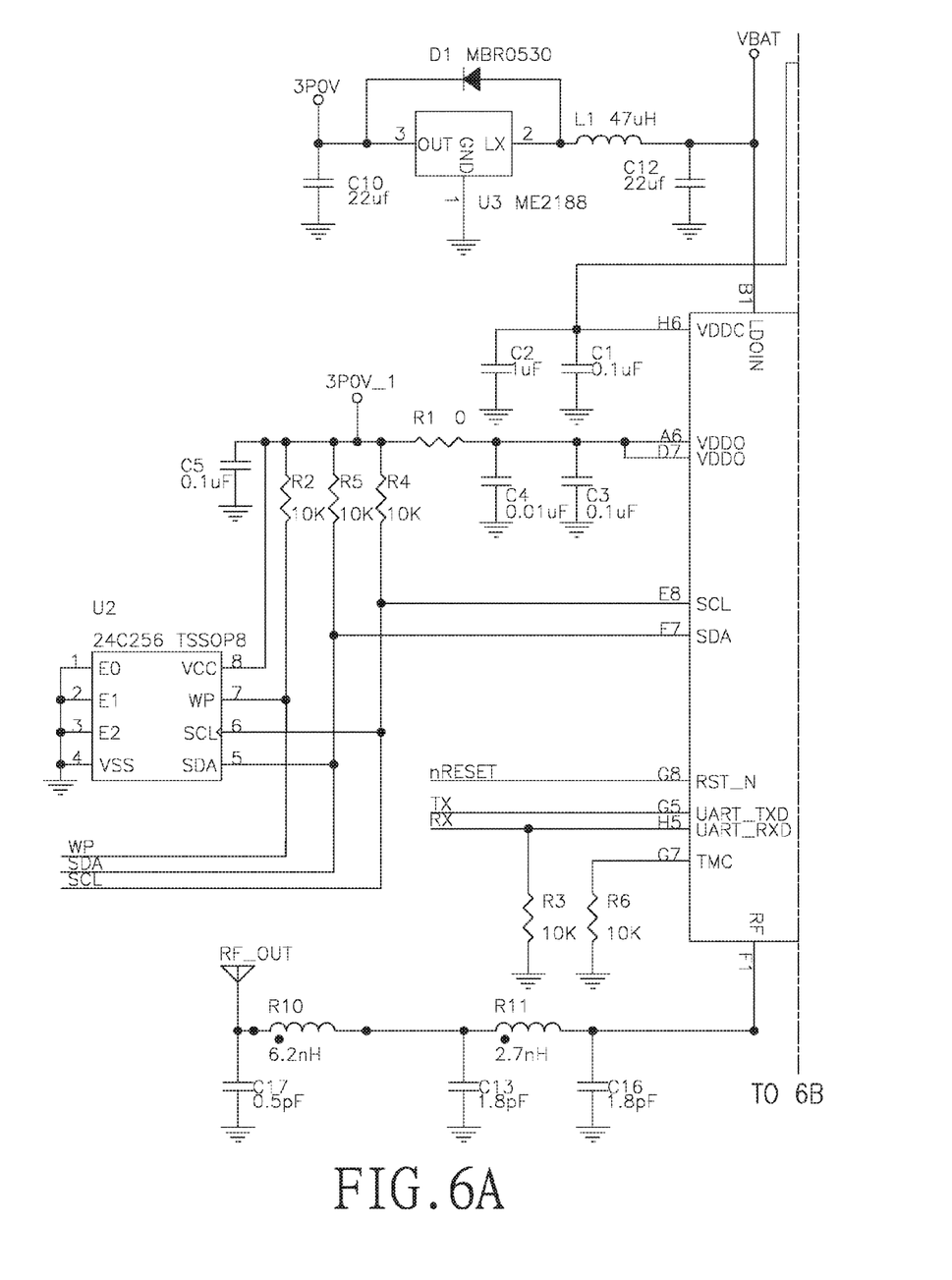
FIGS. 6A and 6B show a circuit diagram of a module/daughter board for a short-range wireless communication unit in FIGS. 1A and 5A.
Figure 6B:
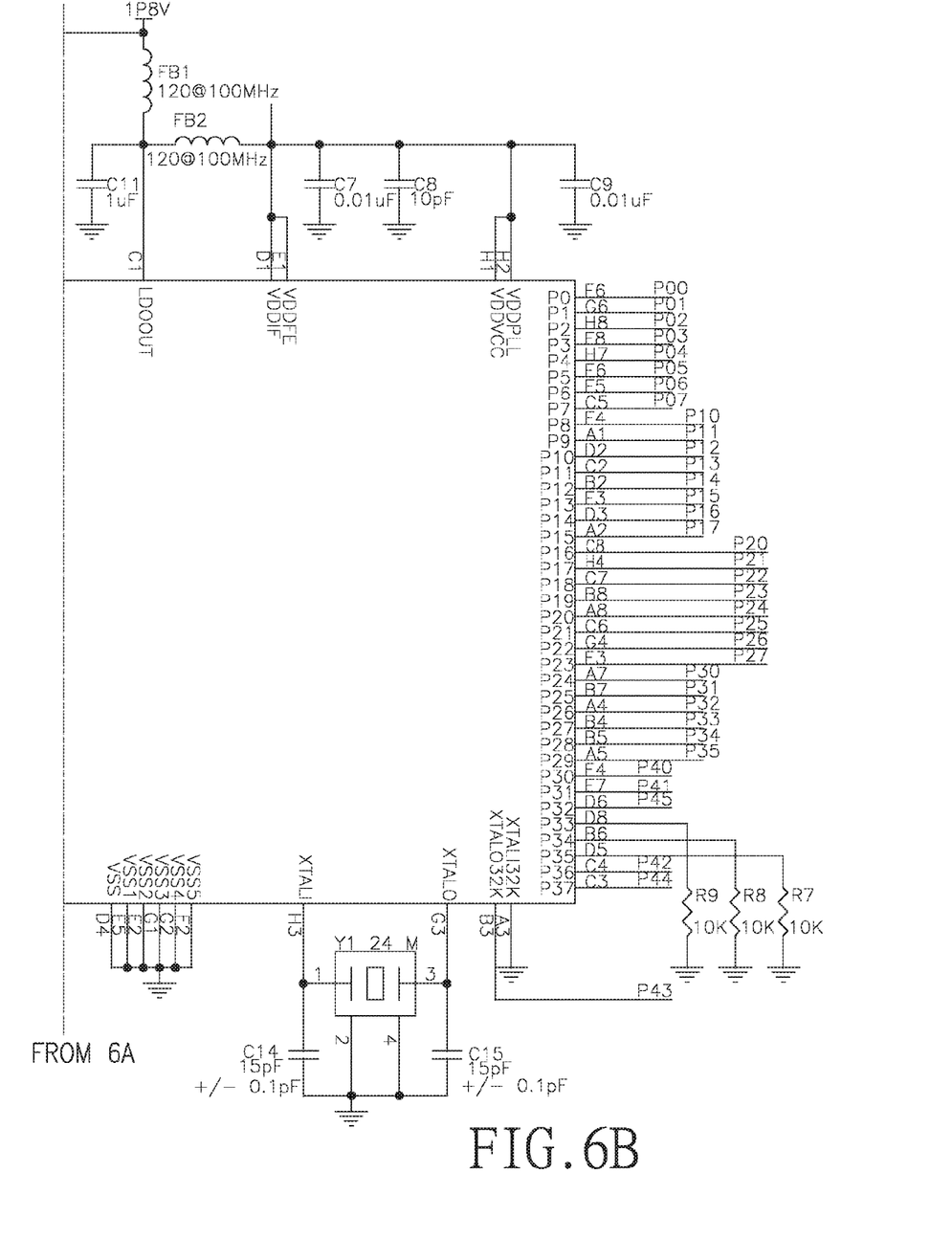

Implementation of certain critical elements, such as the MCU 10, the short-range wireless communication unit 20 and the protocol signal converter 13, may be given by the following examples. The MCU 10 in FIGS. 1A and 5A may be implemented by the chip TMU3130 manufactured by Tenx. The short-range wireless communication unit 20 in FIGS. 1B and 5B can be implemented by a module/daughter board using the chip BCM20370 manufactured by Broadcom. With reference to FIGS. 6A and 6B, what the circuit diagram shows is to map the pin-out configuration, such as A1-H8, of the BCM20370 to that, such as P01 . . . P44, nRESET, TX, RX and the like, of the module/daughter board as shown in FIGS. 1B and 5B. The use of module/daughter board with pin-out configuration different from the chip it uses is a common practice in electronic circuit design to reduce repeated chip certification and increase circuit design flexibility in response to customer's demand. The protocol signal converter 13 in FIGS. 1C and 5C can be implemented by SL811HS manufactured by Cypress.

Figure 7:
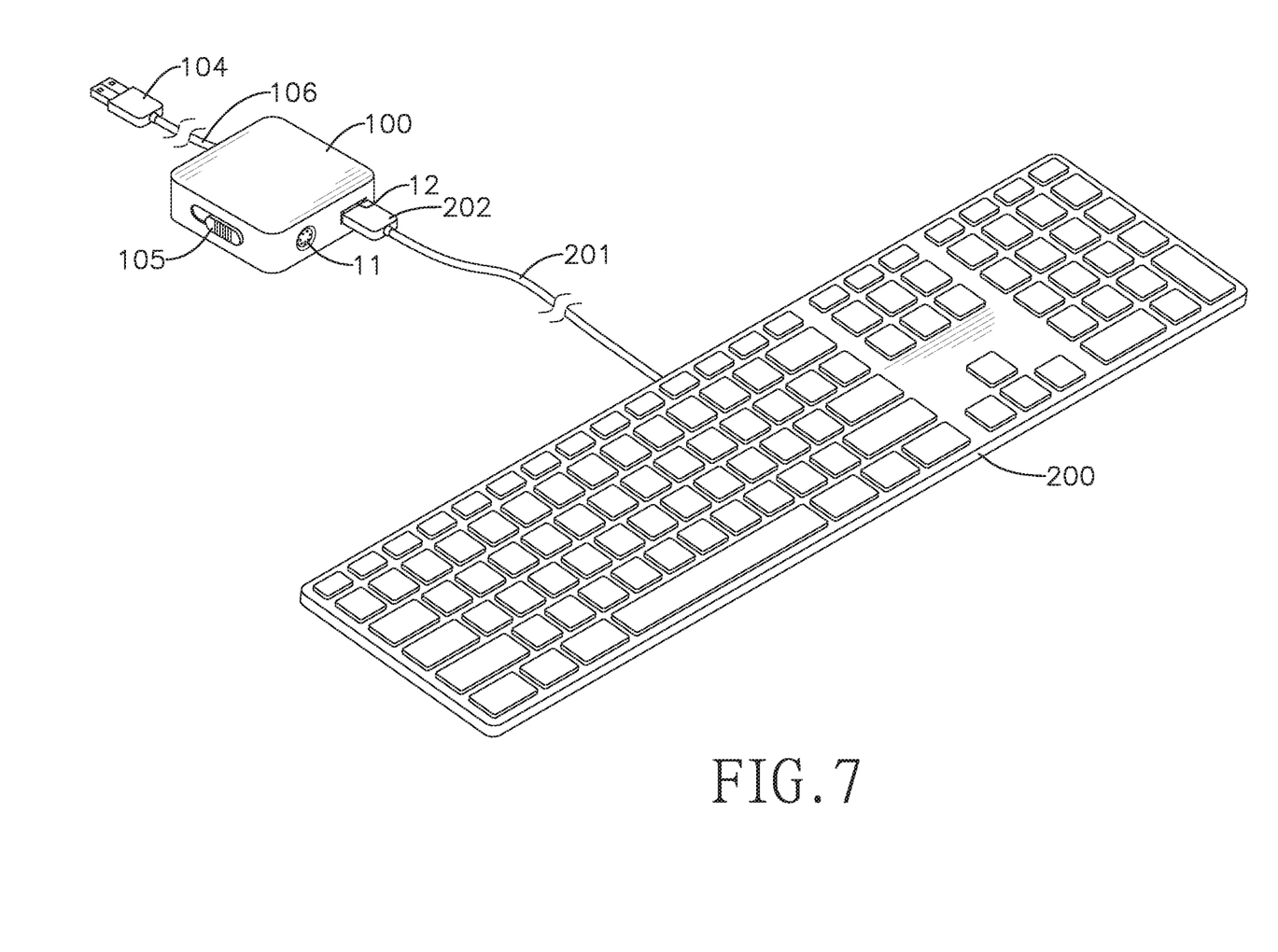
FIG. 7 is a perspective view of the short-range wireless communication converter in FIGS. 5A to 5D connected to an input device.

With reference to FIG. 7, the present embodiment structurally differs from the foregoing embodiment in that the body 100 further has a switch 105 mounted on the body 100 and a cable 106 connected to the connector 104.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A wireless input device comprising:
   a wired input device; and
   a short-range wireless communication converter having:
      a micro-controller unit (MCU) having multiple input and output (I/O) terminals;
      a first-protocol connection port that receives a first signal inputted from the wired input device selectively and detachably connected to the first-protocol connection port, is connected to at least one I/O terminal of the MCU, and has a power pin;
      a second-protocol connection port that receives a second signal inputted from the wired input device selectively and detachably connected to the second-protocol connection port, is connected to at least one I/O terminal of the MCU through a protocol signal converter, and has a power pin, wherein the second signal is converted by the protocol signal converter;
      a short-range wireless communication unit connected to at least one I/O terminal of the MCU; and
      a power circuit having:
         a battery;
         a first voltage regulation circuit having a voltage regulator, wherein an input terminal of the first voltage regulation circuit is connected to the battery, and an output terminal of the first voltage regulation circuit is connected to the MCU, the protocol signal converter and the short-range wireless communication unit; and
         a second voltage regulation circuit having a voltage regulator, wherein an input terminal of the second voltage regulation circuit is connected to the battery, and an output terminal of the second voltage regulation circuit is connected to the power pins of the first-protocol connection port and the second-protocol connection port;
   wherein the first signal or the converted second signal is received and encoded by the MCU, and is wirelessly transmitted to a paired device through the short-range wireless communication unit.

2. The wireless input device as claimed in claim 1, wherein
   the second-protocol connection port is a USB (Universal Serial Bus) port and further has a pair of data pins; and
   the first-protocol connection port is a PS/2 (Personal System 2) socket.

3. The wireless input device as claimed in claim 2, wherein the short-range wireless communication unit has:
   an indicator circuit having at least one light-emitting diode (LED), wherein one end of each one of the at least one LED is connected to the short-range wireless communication unit, and the other end of the LED is connected to a power source through a resistor; and a pairing button adapted to pair with a device to be connected.

4. The wireless input device as claimed in claim 3, wherein the MCU is built in the protocol signal converter.

5. An input device having a short-range wireless communication converter, comprising:
- a computer input device having a bottom;
- a body integrated on the bottom of the computer input device and having a cable-receiving slot formed in the bottom of the body; and
- a short-range wireless communication converter mounted inside the body and having:
  - a micro-controller unit (MCU) having multiple input and output (I/O) terminals;
  - a first-protocol connection port selectively and detachably connected to the computer input device to receive a first signal from the computer input device, connected to at least one I/O terminal of the MCU, and having a power pin and mounted on the body;
  - a second-protocol connection port selectively and detachably connected to the computer input device to receive a second signal from the computer input device, connected to at least one I/O terminal of the MCU through a protocol signal converter, and having a power pin and mounted on the body, wherein the second signal is converted by the protocol signal converter;
  - a short-range wireless communication unit connected to at least one I/O terminal of the MCU; and
  - a power circuit having:
    - a battery;
    - a first voltage regulation circuit having a voltage regulator, wherein an input terminal of the first voltage regulation circuit is connected to the battery, and an output terminal of the first voltage regulation circuit is connected to the MCU, the protocol signal converter and the short-range wireless communication unit; and
    - a second voltage regulation circuit having a voltage regulator, wherein an input terminal of the second voltage regulation circuit is connected to the battery, and an output terminal of the second voltage regulation circuit is connected to the power pins of the first-protocol connection port and the second-protocol connection port;
  - wherein the first signal or the converted second signal is received and encoded by the MCU, and is wirelessly transmitted to a paired device through the short-range wireless communication unit.

6. The input device as claimed in claim 5, wherein
- the second-protocol connection port is a USB port and further has a pair of data pins; and
- the first-protocol connection port is a PS/2 socket.

7. The input device as claimed in claim 6, wherein the short-range wireless communication unit has:
- an indicator circuit having at least one LED, wherein one end of each one of the at least one LED is connected to the short-range wireless communication unit, and the other end of the LED is connected to a power source through a resistor; and
- a pairing button adapted to pair with a device to be connected.

8. The input device as claimed in claim 7, wherein the MCU is built in the protocol signal converter.

* * * * *